United States Patent
Leo, II

(10) Patent No.: US 9,334,887 B2
(45) Date of Patent: May 10, 2016

(54) CLIP

(71) Applicant: Artil Arrighini Leo, II, Birmingham, MI (US)

(72) Inventor: Artil Arrighini Leo, II, Birmingham, MI (US)

(73) Assignee: Artil Arrighini Leo, II, Birmingham, MI (US)

(*) Notice: Subject to any disclaimer, the term of this patent is extended or adjusted under 35 U.S.C. 154(b) by 0 days.

(21) Appl. No.: 14/290,320

(22) Filed: May 29, 2014

(65) Prior Publication Data
US 2014/0373310 A1    Dec. 25, 2014

Related U.S. Application Data

(60) Provisional application No. 61/838,663, filed on Jun. 24, 2013.

(51) Int. Cl.
| | |
|---|---|
| *F16B 2/22* | (2006.01) |
| *F16L 3/02* | (2006.01) |
| *H02G 3/32* | (2006.01) |
| *F16L 3/04* | (2006.01) |
| *F16L 3/12* | (2006.01) |

(52) U.S. Cl.
CPC ... *F16B 2/22* (2013.01); *F16L 3/02* (2013.01); *H02G 3/32* (2013.01); *F16L 3/04* (2013.01); *F16L 3/1207* (2013.01); *Y10T 24/3916* (2015.01); *Y10T 24/44026* (2015.01); *Y10T 24/44769* (2015.01)

(58) Field of Classification Search
CPC .............. H01R 4/186; F16L 3/02; F16L 3/00; F16L 3/04; F16L 3/08; F16L 3/12; F16L 3/1207; F16B 2/22; H02G 3/32
USPC ........ 248/316.7, 65, 74.2, 68.1, 71; 174/71 R
See application file for complete search history.

(56) References Cited

U.S. PATENT DOCUMENTS

| | | | | |
|---|---|---|---|---|
| 593,978 | A | * | 11/1897 | Boehm .................. 224/462 |
| 662,935 | A | * | 12/1900 | Hibberd et al. ............. 248/74.1 |
| 949,243 | A | * | 2/1910 | Murray ...................... 174/71 R |
| 3,082,984 | A | | 3/1963 | Larsson et al. |
| 3,086,802 | A | | 4/1963 | Keeton |
| 3,571,863 | A | * | 3/1971 | Logan .......................... 403/344 |
| 3,679,250 | A | * | 7/1972 | Marsden ...................... 403/313 |
| 3,894,706 | A | * | 7/1975 | Mizusawa .................... 248/68.1 |
| 5,121,894 | A | * | 6/1992 | Twork et al. ................. 248/316.7 |
| D364,336 | S | | 11/1995 | Calusinski |
| 5,577,697 | A | * | 11/1996 | Accordino ................. 248/206.5 |

(Continued)

FOREIGN PATENT DOCUMENTS

| | | |
|---|---|---|
| EP | 1691460 A1 | 8/2006 |
| WO | 2011149361 A2 | 12/2011 |

*Primary Examiner* — Anita M King
(74) *Attorney, Agent, or Firm* — Carlson, Gaskey & Olds, P.C.

(57) ABSTRACT

A clip includes a pair of end portions each having an arcuate portion. A pair of opposed gripping portions are each connected at each end to the pair of end portions. The arcuate portions provide a resilient force on the gripping portions toward one another. The end portions and gripping portions are integrally molded as a single piece of plastic. Optionally, the clip can be used with a base. The base includes a body portion and a pair of opposed raised portions. The gripping portions of the clip snap fit into the base, between the raised portions. This secures the clip to the base and retains the gripping portions in a closed position.

21 Claims, 6 Drawing Sheets

(56) References Cited

U.S. PATENT DOCUMENTS

| | | |
|---|---|---|
| 6,018,850 A | 2/2000 | Lorber |
| D433,930 S | 11/2000 | Kalat |
| 6,334,242 B1 * | 1/2002 | Scollard et al. ............ 24/459 |
| 6,378,827 B1 | 4/2002 | Kacines |
| 6,457,218 B1 | 10/2002 | Lawrence |
| 6,536,719 B2 | 3/2003 | Rivera |
| 6,622,976 B1 * | 9/2003 | Ianello ............ 248/73 |
| D510,257 S | 10/2005 | Marty et al. |
| D531,019 S | 10/2006 | Plumer |
| D537,331 S | 2/2007 | Hill |
| D587,564 S | 3/2009 | Kodi |
| 7,861,981 B2 * | 1/2011 | Olver ............ 248/68.1 |
| 8,345,913 B2 | 1/2013 | Pang et al. |
| 8,590,823 B2 | 11/2013 | Rothbaum et al. |
| 2007/0246614 A1 * | 10/2007 | Allmann et al. ............ 248/65 |
| 2009/0083954 A1 | 4/2009 | Hoggan |
| 2012/0128193 A1 | 5/2012 | Stevinson |
| 2012/0279019 A1 | 11/2012 | Cassaday |

* cited by examiner

CLIP

BACKGROUND OF THE INVENTION

There are many different designs of resilient clips. Clips can be used for various purposes, such as holding multiple items together or holding an item in place. Some clips are formed of multiple pieces, such as metal springs. Some clips are unnecessarily complicated and as a consequence are more expensive and less durable than would be desired.

SUMMARY

A clip includes a pair of end portions each having an arcuate portion. A pair of opposed gripping portions are each connected at each end to the pair of end portions. The arcuate portions provide a resilient force on the gripping portions toward one another. The end portions and gripping portions are integrally molded as a single piece of plastic.

Optionally, the clip can be used with a base. The base includes a body portion and a pair of opposed raised portions. The gripping portions of the clip snap fit into the base, between the raised portions. This secures the clip to the base and retains the gripping portions in a closed position.

DETAILED DESCRIPTION OF THE PREFERRED EMBODIMENT

Figure 1:
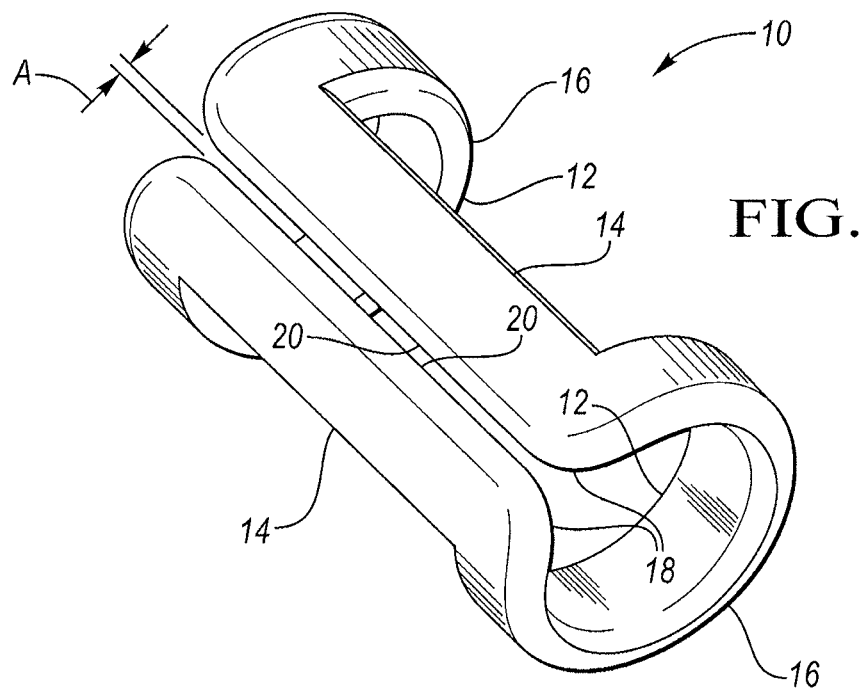
FIG. 1 is a perspective view of a clip according to one embodiment of the present invention.

A clip 10 according to one embodiment of the present invention is shown in FIGS. 1-7. Referring primarily to FIG. 1, the clip 10 generally includes a pair of end portions 12 connected by gripping portions 14. Generally speaking, the end portions provide a resilient force tending to keep the gripping portions 14 adjacent one another. Items can be gripped or clamped between the gripping portions 14 by the resilient force provided by the end portions 12.

In this embodiment, the end portions 12 each include an arcuate portion 16 having angled portions or connecting portions 18 at each end. Each arcuate portion 16 is generally annular (interrupted by the connecting portions 18), having generally cylindrical interior and exterior surfaces. Each connecting portion 18 is connected to one end of one of the gripping portions 14, such that each gripping portion 14 is connected to one connecting portion 18 from each end portion 12. The arcuate portions 16 are resilient and each have a cross-section and aspect ratio selected to provide a particular resilience. However, the cross-section and aspect ratio could be changed for a different design in order to change the resilient characteristics of the arcuate portions 16.

The arcuate portions 16 of each end portion 12 position the connecting portions 18 such that the gripping portions 14 are adjacent one another. In the embodiment shown, each gripping portion 14 has an inner edge 20. The inner edges 20 are spaced apart from one another by space "A." For a particular design or embodiment of clip 10, the space A can be selected for a particular application and could be greater or smaller or zero for any particular application.

The inner edges 20 of the gripping portions 14 provide the clamping surfaces of the clip 10, with the clamping action from the resilience force provided by the arcuate portions 16. The inner edges 20 of the gripping portions 14 can, but need not be, complementary to one another. In the embodiment shown, the inner edges 20 are straight and parallel to one another. However, the inner edges 20 could have sinusoidal edges, saw-tooth edges, interlocking tabs, etc. Projections from the inner edges 20 could be aligned or could be mated with complementary recesses on the opposite inner edge 20.

Figure 2:
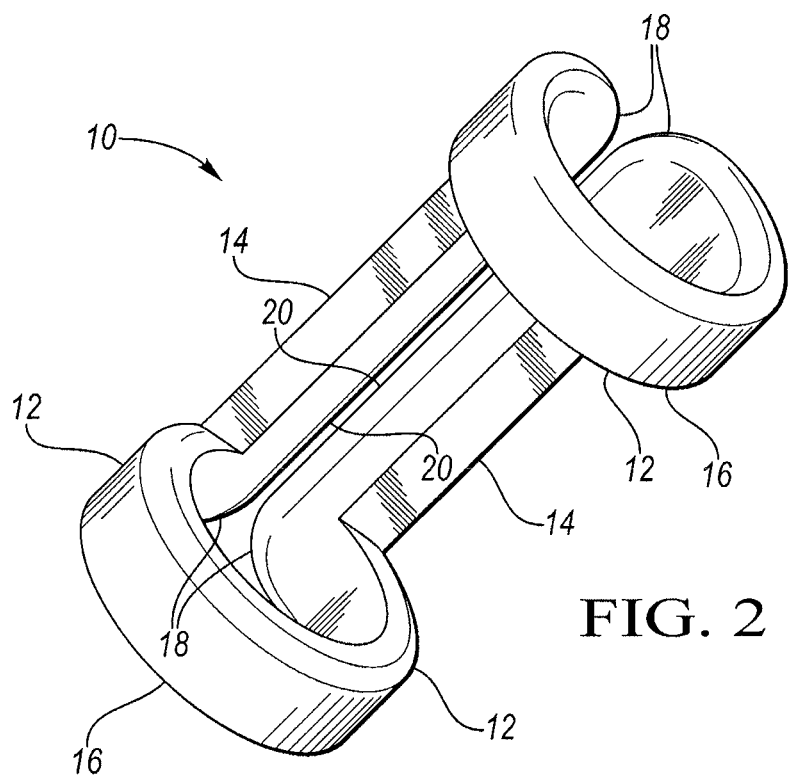
FIG. 2 is a bottom perspective view of the clip of FIG. 1.

FIG. 2 is a bottom perspective view of the clip. As shown, the arcuate portions 16 have generally cylindrical interior and exterior surfaces, although other arrangements could be used. The gripping portions 14 are shown generally parallel to one another and spaced apart in the normal or non-deflected position.

Figure 3:
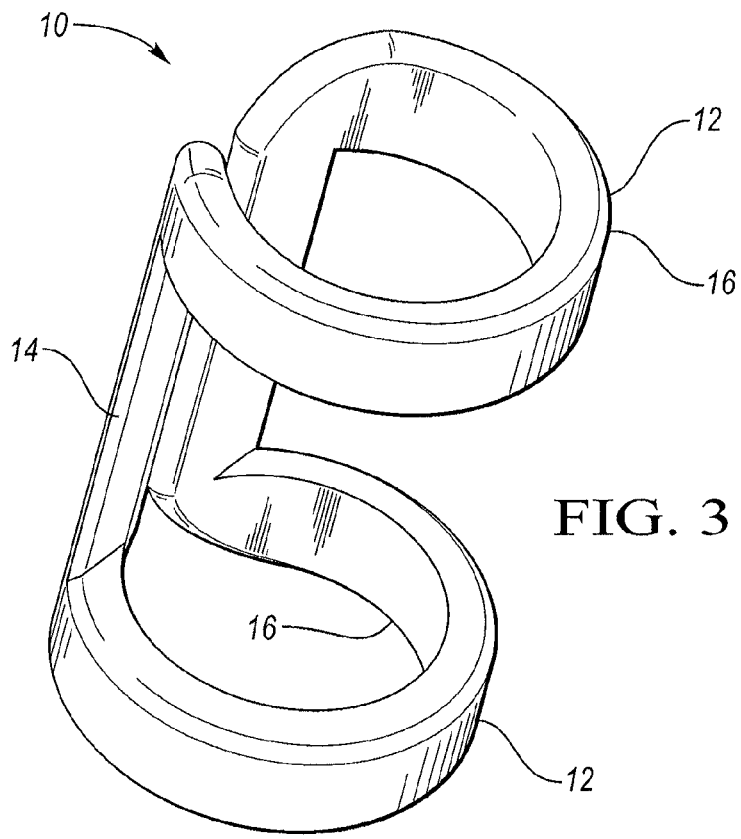
FIG. 3 is an end perspective view of the clip of FIG. 1.
Figure 4:
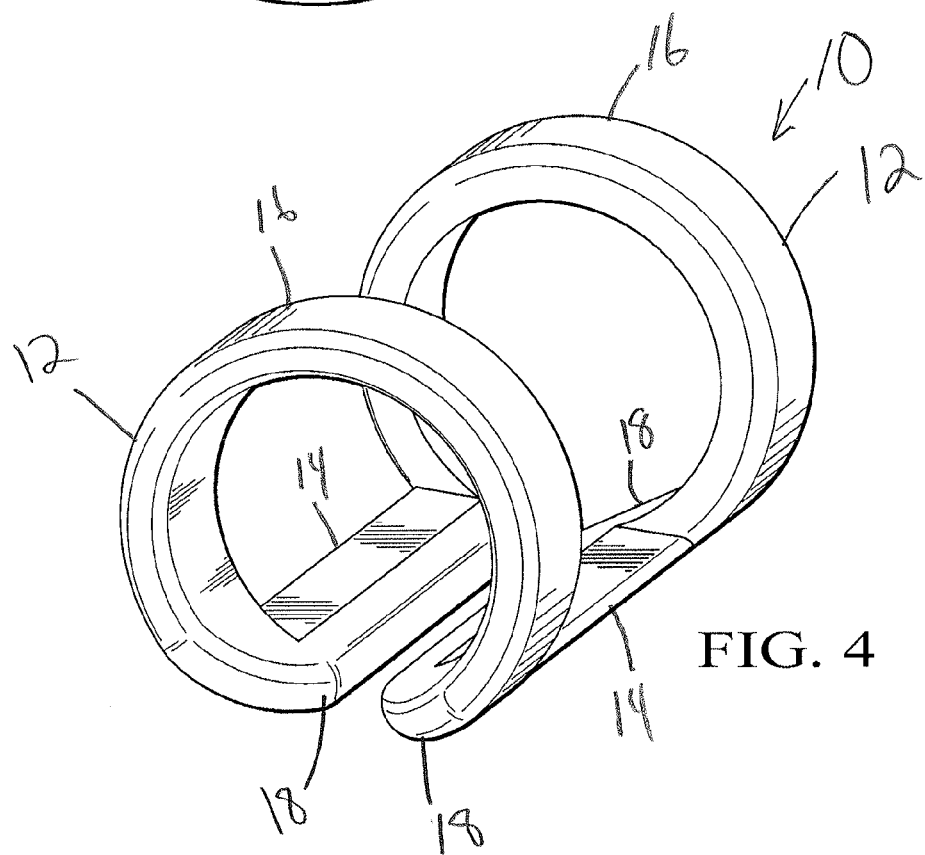
FIG. 4 is another end perspective view of the clip of FIG. 1.
Figure 5:
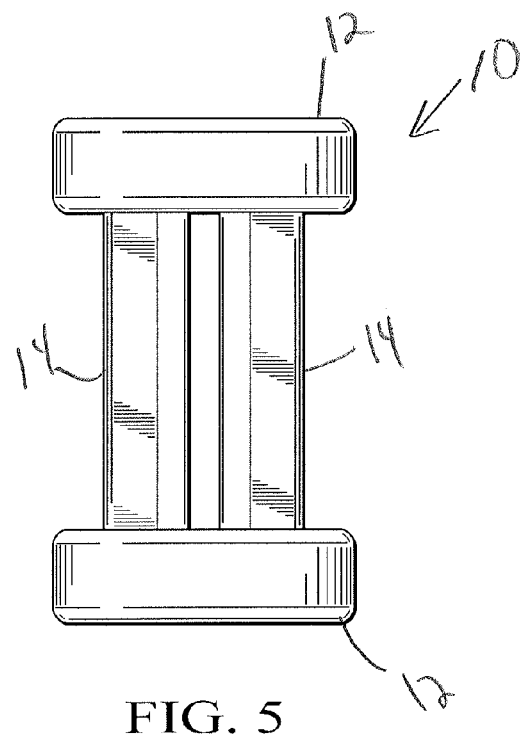
FIG. 5 is a bottom view of the clip of FIG. 1.
Figures 6, 7:
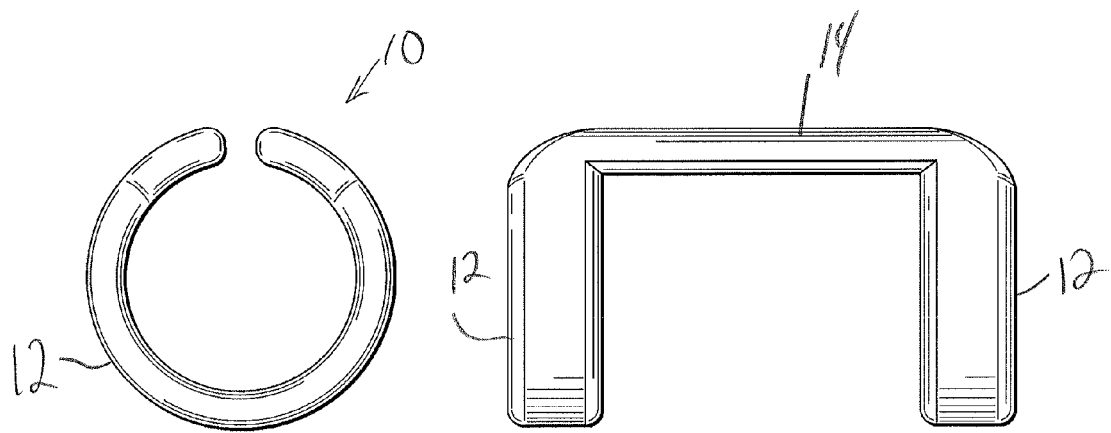
FIG. 6 is an end view of the clip of FIG. 1.
FIG. 7 is a side view of the clip of FIG. 1.

FIGS. 3 and 4 are end perspective views of the clip 10. FIG. 5 is a bottom view of the clip 10. FIG. 6 is an end view of the clip 10. FIG. 7 is a side view of the clip 10.

In use, a user pulls apart the gripping portions 14 to increase the space A and places the item or items to be held by the clip 10 between the inner edges 20 of the gripping portions 14. Upon releasing the clip 10, the arcuate portions 16 of each end portion would resiliently urge the gripping portions 14 toward one another thereby clamping the item or items between the inner edges 20 of the gripping portions 14.

The clip is simple, inexpensive, durable and can be used for a wide variety of applications. For example, and not by way of limitation: the clip could be used as a wire tie or a cable tie, such as for computer wires and cables; the clip can be used to secure items to a user's clothing; the clip can be used to hold items of clothing (e.g., socks) together in the wash; the clip can be used to hang clothing or other items; the clip can be used as a money clip; the clip can be used to hold bags closed, such as potato chip bags; and the clip can be used to gather or hold together various small items.

The clip can be made in various sizes and with different shapes. The length and shape of the gripping portions 14 can be changed in order to provide a different gripping surface. The size, cross-section, aspect ratio of the arcuate portions 16 can be altered to provide different resilience and a different size opening to the clip.

The clip 10 in the embodiment shown is molded as a single piece of plastic. A removable insert or slide can be used to form the inner surfaces of the arcuate portions 16 of each end portion 12. Alternatively, multiple slides could be used to form the clip 10. Alternatively, the clip 10 could be initially molded with the arcuate portions 16 flat and then formed into the arcuate shape as shown while the plastic is still deformable. Any suitable polymer could be used.

Figure 8:
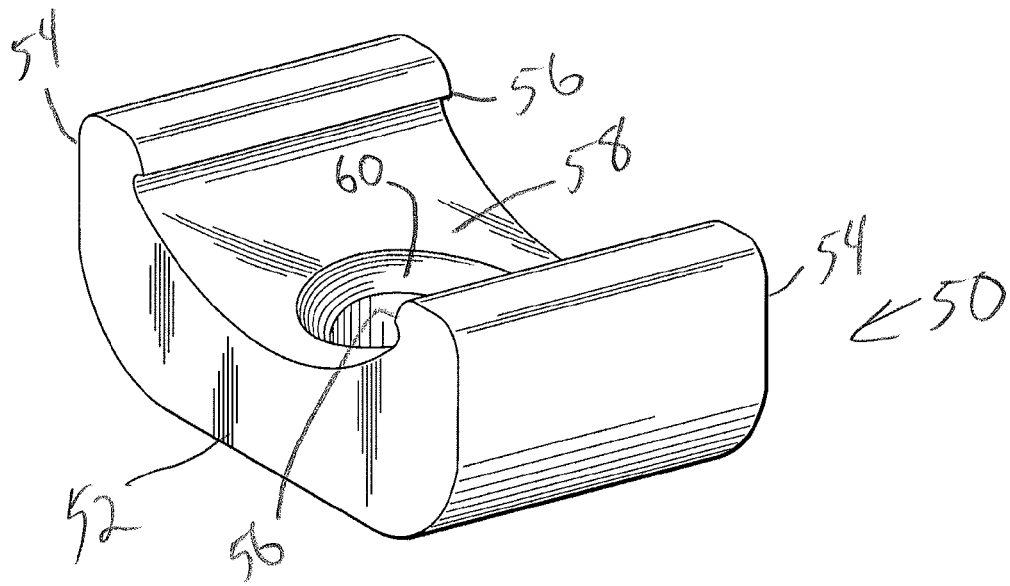
FIG. 8 is a perspective view of a base to be used with the clip of FIG. 1.
Figure 9:
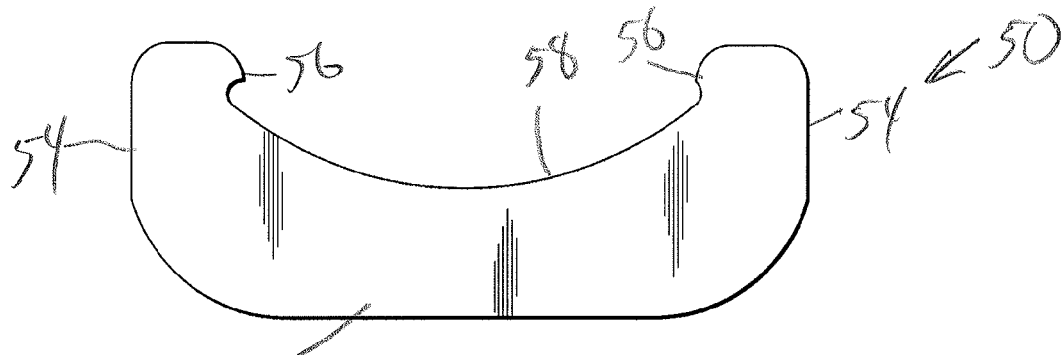
FIG. 9 is side view of the base of FIG. 8.

FIG. 8 is a perspective view of a base 50 that can be used with the clip 10 of FIGS. 1-7. The base 50 includes a body portion 52. A pair of opposed raised portions 52 extend upward from opposite ends of a body portion 52. Catch portions 56 project inward toward one another from each of the raised portions 54. The body portion 52 further includes a concave upper surface 58 curving upward to the raised portions 54 just below the catch portions 56, as shown more clearly in FIG. 9.

Figure 10:
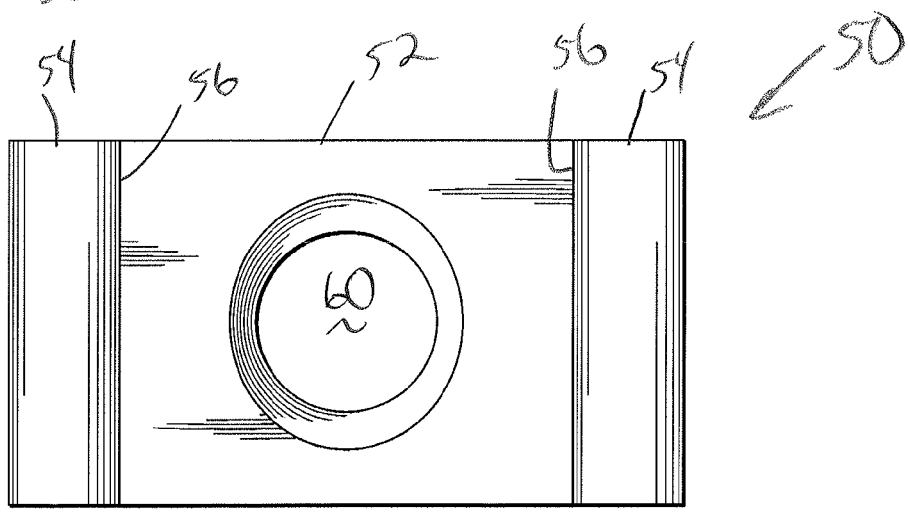
FIG. 10 is a top view of the base of FIG. 8.

An aperture 60 is formed through the body portion 52 of the base 50 as shown in FIG. 10. The aperture 60 is formed through the body portion 52 between the raised portions 54.

Figure 11:
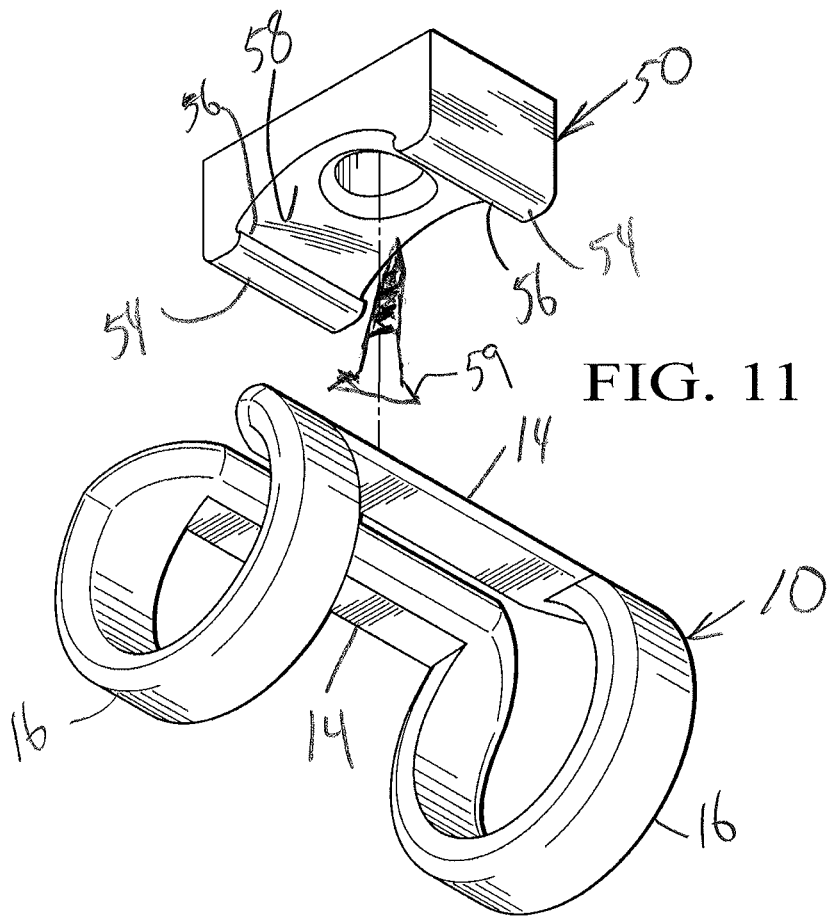
FIG. 11 is an assembly view of the clip of FIG. 1, the base of FIG. 8 and a fastener.
Figure 12:
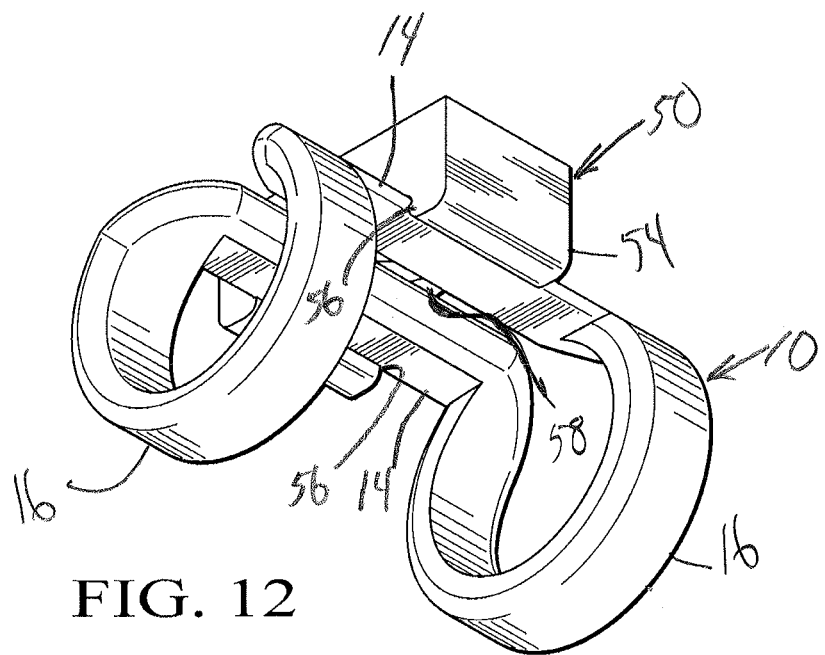
FIG. 12 shows the clip and base of FIG. 11 secured to one another.

As shown in FIGS. 11 and 12, the base 50 is configured to be secured to the gripping portions 14 of the clip 10. A fastener 59, such as a screw, is sized to be received in an aperture through the base 50. As shown in FIG. 12, the gripping portions 14 are received against the concave surface 58 of the base 50 and are secured below the catch portions 56, the gripping portions 14 may be deflected inward toward one another in order to be snap fit into the base 50 below catch portions 56. The resilient arcuate portions 16 bias the gripping portions 14 outward against the raised portions 54 of the base 50 thereby retaining the gripping portions 14 below the catch portions 56 and thereby securing the clip end to the base 50.

Figure 13:
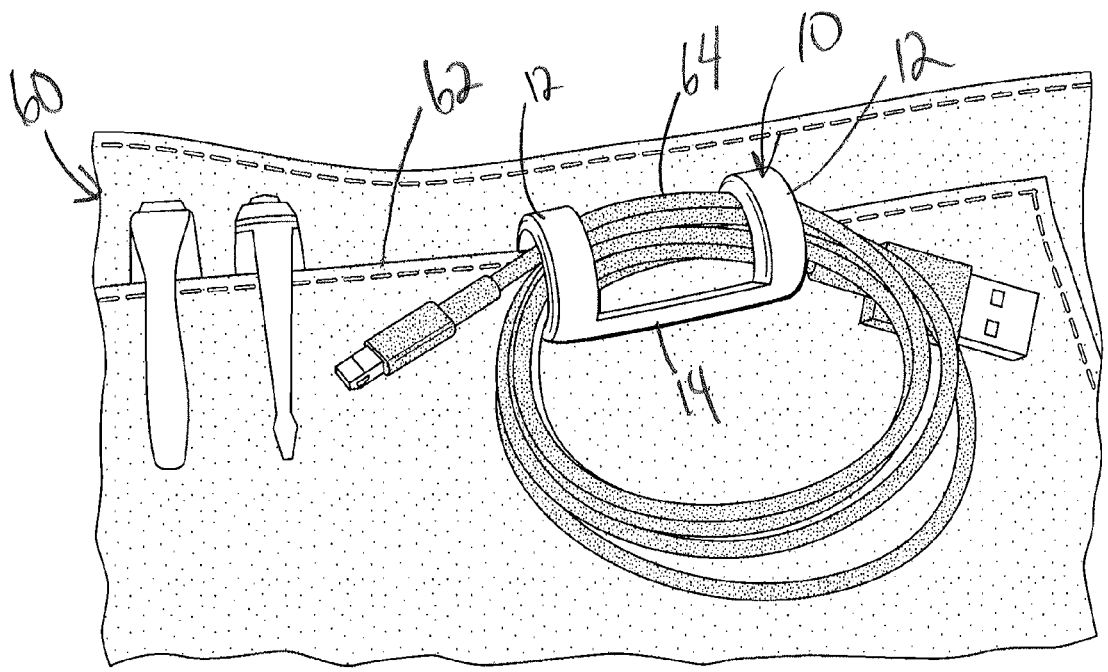
FIG. 13 shows the clip of FIG. 1 securing a cable to a pocket.

FIG. 13 shows the clip 10 in use without the base 50. A cable 64 can be coiled and inserted between the gripping portions 14 such that it extends through the end portions 12 of the clip 10. In FIG. 13, the clip 10 is shown secured to an article 60 of clothing, such as a shirt 60 having a pocket 62. The clip 10 and cable 64 are secured to the pocket 62 by inserting one of the gripping portions 14 into the pocket as shown.

Figure 14:
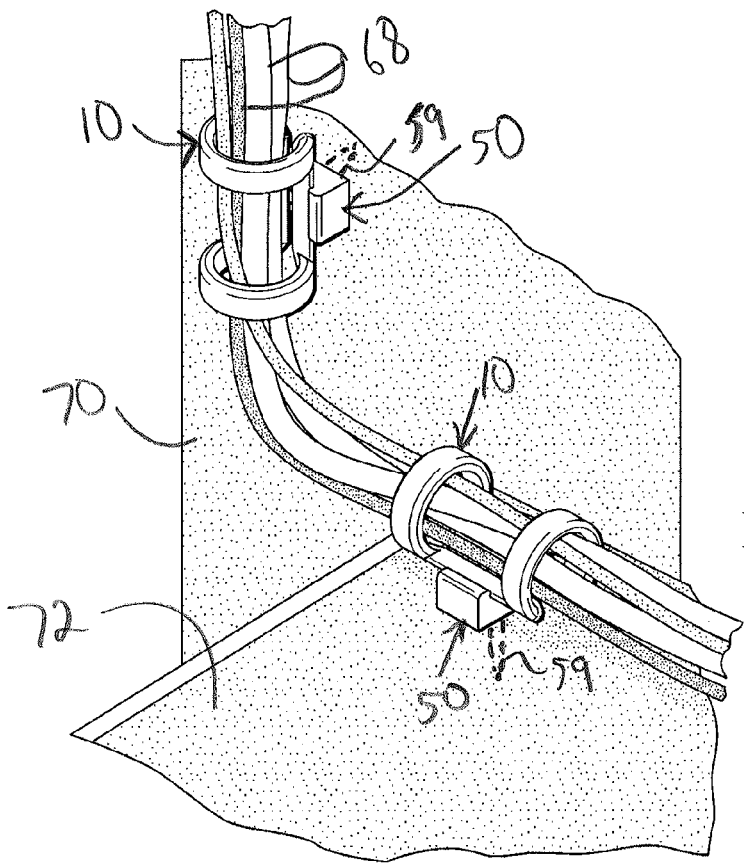
FIG. 14 shows two of the clips and bases of FIG. 12 securing a plurality of cables to a horizontal surface and to a vertical surface.

FIG. 14 shows use of the base 50. In FIG. 14, one base 50 is secured to a vertical surface 70, such as a wall or side of a desk, by the fastener 59 while another base 50 is secured to a horizontal surface 72, such as an upper surface of a desk or table, by another fastener 59. A clip 10 is secured in each base 50 for securing a plurality of cables 68. For example, the clips 10 and bases 50 can be used for cable 68 management for computers, audio visual equipment, etc.

As another example, the base 50 can be secured to a ceiling or rafters. The clip 10 can be wrapped around cables or wires. The clip 10 can then be secured to (or removed from) the base 50 with one hand, leaving the user's other hand free to manipulate the cables or wires. This could be used to install cables above an insulated drop ceiling.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A clip comprising:
a pair of end portions each having an arcuate portion, wherein the arcuate portions curve about an axis of the clip, the arcuate portions spaced axially along the axis away from one another; and
a pair of opposed gripping portions, each gripping portion connected at each end to the pair of end portions, the arcuate portions providing a resilient force on the gripping portions toward one another, wherein the pair of end portions and the pair of gripping portions are integrally molded as a single piece of plastic.

2. The clip of claim 1 wherein the gripping portions are spaced apart and parallel to one another when the arcuate portions are in an undeflected state.

3. The clip of claim 1 wherein the gripping portions are elongated, parallel portions.

4. The clip of claim 3 wherein the arcuate portions are generally cylindrical.

5. The clip of claim 1 further including a plurality of wires extending through the pair of end portions.

6. The clip of claim 1 wherein the gripping portions are inhibited from moving away from one another by a base, wherein the base is removably secured to the gripping portions.

7. The clip of claim 6 wherein the base includes a body portion and a pair of opposed raised portions, a pair of opposed catch portions project toward one another from the raised portions, the gripping portions secured by the catch portions.

8. The clip and base of claim 7 wherein the base includes an aperture through the body portion for receiving a fastener therethrough, wherein the aperture in the base is aligned with the gripping portions.

9. The clip and base of claim 8 further including a fastener inserted through the aperture through the body portion and protruding from the base away from the clip.

10. The clip and base of claim 9 further including a plurality of wires extending through the pair of end portions.

11. The clip and base of claim 9 wherein the fastener is a screw having a threaded portion and a head, wherein the head of the screw is between the base and the clip and the threaded portion protruded from the base away from the clip.

12. A clip comprising:
a pair of end portions each having an arcuate portion, the end portions spaced axially away from one another; and
a pair of opposed, elongated, parallel, spaced-apart gripping portions, each gripping portion connected at each end to the pair of end portions, the gripping portions extending axially between the arcuate portions, the arcuate portions providing a resilient force on the gripping portions toward one another, wherein the pair of end portions and the pair of gripping portions are integrally molded as a single piece of plastic.

13. The clip of claim 12 wherein the gripping portions are held together by a base, wherein the base is removably secured to the gripping portions.

14. The clip of claim 13 wherein the base includes a body portion and a pair of opposed raised portions, the gripping portions secured between the opposed raised portions of the base, wherein the raised portions of the vase have an axial length that is only between the arcuate portions and does not abut the accurate portions.

15. The clip and base of claim 14 wherein the base includes an aperture through the body portion for receiving a fastener therethrough.

16. The clip and base of claim 15 further including a fastener inserted through the aperture through the body portion.

17. The clip and base of claim 16 further including a plurality of wires extending through the pair of end portions.

18. A clip comprising:
a first gripping portion, wherein the first gripping portion is generally elongated along a first axis;
a second gripping portion adjacent the first gripping portion, wherein the second gripping portion is generally elongated along a second axis generally parallel to the first axis;
a first end portion having a first arcuate portion extending in an arcuate path from a first connecting portion to a second connecting portion, the first connecting portion of the first end portion connected to a first end of the first gripping portion, the second connecting portion of the first end portion connected to a first end of the second gripping portion;

a second end portion spaced away from the first end portion in a direction generally parallel to the first axis, the second end portion having a second arcuate portion extending in an arcuate path from a first connecting portion to a second connecting portion, the first connecting portion of the second end portion connected to a second end of the first gripping portion, the second connecting portion of the second end portion connected to a second end of the second gripping portion, the first and second arcuate portions providing a resilient force on the first and second gripping portions toward one another, wherein the first and second end portions and the first and second gripping portions are integrally molded as a single piece of plastic.

19. The clip of claim 18 wherein the first and second gripping portions are the only connections between the first and second end portions.

20. The clip of 19 wherein the clip is void of material between the first and second arcuate portions.

21. The clip of claim 20 wherein the first arcuate portion is spaced from the second arcuate portion by a distance greater than an axial width of the first arcuate portion and the second arcuate portion.

* * * * *